US 6,698,269 B2

(12) United States Patent
Baber et al.

(10) Patent No.: US 6,698,269 B2
(45) Date of Patent: Mar. 2, 2004

(54) TRANSDUCER IN-SITU TESTING APPARATUS AND METHOD

(75) Inventors: Isaak Baber, Virginia Beach, VA (US); Mark F. Bocko, Caledonia, NY (US); Joseph E. Pegg, Virginia Beach, VA (US); William Simmons, Virginia Beach, VA (US)

(73) Assignee: Oceana Sensor Technologies, Inc., Virginia Beach, VA (US)

( * ) Notice: Subject to any disclaimer, the term of this patent is extended or adjusted under 35 U.S.C. 154(b) by 0 days.

(21) Appl. No.: 10/131,673

(22) Filed: Apr. 24, 2002

(65) Prior Publication Data

US 2003/0024298 A1 Feb. 6, 2003

Related U.S. Application Data

(60) Provisional application No. 60/286,932, filed on Apr. 27, 2001.

(51) Int. Cl.$^7$ .................................. G01P 21/00
(52) U.S. Cl. ........................... 73/1.08; 73/1.38
(58) Field of Search ............... 73/1.08, 1.15, 73/1.37, 1.38, 1.41; 374/1

(56) References Cited

U.S. PATENT DOCUMENTS

| 5,251,469 A | * | 10/1993 | Chan | 73/1.86 |
| 5,457,982 A | * | 10/1995 | Spies et al. | 73/1.38 |
| 5,753,793 A | * | 5/1998 | Lindahl et al. | 73/1.15 |

OTHER PUBLICATIONS

Neuert, H. K. P., "Instrument Transducer", Clarendon Press, Oxford (1975).
Morgan Matroc Inc., "Piezoelectric Technology: Data for Designers", available from www.morganelectroceramics.com. not dated.

* cited by examiner

Primary Examiner—Robert Raevis
(74) Attorney, Agent, or Firm—Brian B. Shaw, Esq.; Donna P. Suchy, Esq.; Harter, Secrest & Emery LLP

(57) ABSTRACT

The present invention provides an apparatus and method for in-situ testing of transducers, and more particularly to the testing of piezoelectric transducers including piezoelectric accelerometers. Circuits, measurement techniques, and interpretative algorithms to enable in-situ testing of piezoelectric accelerometers are described. Accelerometers that employ a piezoelectric material to convert mechanical strains into electronic signals are reciprocal electromechanical transducers. In such transducers the electrical output impedance of the sensor is dependent upon the electrical and mechanical parameters of the sensor. The procedure described in this disclosure includes methods of measuring the transducer electrical output impedance as a function of frequency and the extraction of the electrical and mechanical transducer parameters from the measured data. The measured values of the transducer parameters may be interpreted to provide an indication of the operational status of the transducer. In addition to allowing verification of correct transducer performance, a range of failure conditions and degradations may be inferred from the transducer parameter values.

25 Claims, 11 Drawing Sheets

The block diagram of the sensor self-test system.

The block diagram of the sensor self-test system.

Generic amplifier self-test configuration.

Three wire voltage mode self-test circuit.

Three wire charge amplifier.

The two-wire charge mode preamplifier with self-test feature.

TRANSDUCER IN-SITU TESTING APPARATUS AND METHOD

CROSS REFERENCE TO RELATED APPLICATIONS

This application claims priority to provisional application Serial No. 60/286,932 entitled METHOD AND APPARATUS FOR AUTOMATED IN-SITU TESTING OF SENSORS INCLUDING PIEZOELECTRIC ACCELEROMETERS, filed Apr. 27, 2001.

FIELD OF INVENTION

This invention relates to an apparatus and method for in-situ testing of transducers, and more particularly to the testing of piezoelectric transducers including piezoelectric accelerometers.

BACKGROUND

Sensors and transducers are widely used in measurement systems. "Sensor" normally refers to a device that detects a change in a physical property due to a physical stimulus and turns that stimulus into a signal, which can be measured or recorded. "Transducer" normally refers to a device that transfers energy of one kind to another in the same or a different form. Thus the sensor is considered to be the sensing element itself and the transducer is considered to be the sensing element plus any associated circuitry for transmitting the measured physical change to a remote location. Transducers can be used to test the state of a mechanical or physical system or some portion of that system.

Through the use of transducers the properties of a system can be measured by observing the change in the properties of another system. For example, the absorption of ultraviolet light in some chemical compounds can be measured by directing a specific incident spectrum of light onto a compound and measuring the intensity of reflected light as a function of wavelength. The sensor provides the measurement and the transducer converts it to an electrical signal that is representative of the measurement. From the signal a computer analyzes which wavelengths are absorbed and which are reflected while also taking into account any other factors.

There are a number of types of transducers. Generally transducers are classified according to the physical effect that they use or according to the property that they measure. For instance, the effect that they use might be piezoelectric or photovoltaic effect and the property that they measure might be a measurement of length or temperature. Although transducers are often used in mechanical and physical systems, the amount of confidence in the result of a measurement taken through a sensor is greatly increased when all the factors influencing that measurement are monitored.

There is a class of transducers that are called self-generating transducers, which include thermocouples, piezoelectric, and photovoltaic transducers among others. These transducers do not require a power supply because they generate a signal internally. A thermocouple, for example, produces a change in voltage in response to a temperature difference and a piezoelectric material generates a charge that can be measured when it is stressed. There are a number of piezoelectric devices including accelerometers.

Piezoelectric devices generally are particular types of crystals that develop a charge when stressed in a specific direction. The charge that develops in a piezoelectric transducer is proportional to both the piezoelectric constants of the material and the applied stress on the piezoelectric device. This piezoelectric constant depends on the mode of operation employed including bend, shear and compression. Quartz crystals are used as piezoelectric devices in some systems, but manufactured ceramics, such as Lead-zirconate-titanate (PZT) ceramics, are also widely used in piezoelectric transducers because they have a higher piezoelectric constant and therefore a higher charge output. Many piezoelectric transducers have built-in charge amplifiers. This greatly reduces problems with interference and low signal levels.

Generally, piezoelectric accelerometers and other transducers that are being used as sensors are meant to operate for long periods of time with minimal maintenance. It is important that if there is a failure or degradation of the piezoelectric material or transducer that the operator know this as soon as possible. For instance, if there is a failure of the bond between the structure being monitored and the piezoelectric accelerometer, it would be important for an operator to know this as soon as possible since any data collected subsequent to the failure would be unreliable. If there is any internal mechanical failure of the piezoelectric accelerometer, the device is useless and needs to be replaced immediately.

In the past, failure or degradation and other related properties have been difficult to ascertain without specific testing equipment and without taking apart the machine on which the transducer was installed. With the advent of microcircuitry and embedded sensors, this is extremely expensive and difficult to accomplish without destroying the transducer and possibly other parts of the monitoring device as well as the body being monitored. Thus any sensor data must be accurate and reliable if it is to form the basis of the very important and costly condition-based maintenance decisions.

Accordingly, there is a need for improvement in the art to enable sensors and transducers to be tested in-situ and specifically, there is a need for an apparatus and method to allow in-situ testing of transducers such as piezoelectric transducers and accelerometers that convert mechanical strain to an electric signal. There is a particular need for a self-testing transducer circuit. It is to such improvements that the present invention is directed.

SUMMARY OF INVENTION

The present invention is directed to an apparatus and method for the in-situ testing of transducers, and more particularly to the testing of piezoelectric transducers including piezoelectric accelerometers. The self-testing apparatus includes a transducer characterized by a self-resonant frequency, an amplifier connected to the transducer, a signal source generating a test signal having a spectrum at least overlapping the self-resonant frequency of the transducer and an analyzer connected to the amplifier. The analyzer measures the response of the transducer to the test signal and characterizing at least one parameter of the transducer. In many cases the self-testing apparatus can be simply retrofitted to an existing transducer circuit.

BRIEF DESCRIPTION OF THE DRAWINGS

In the detailed description of the preferred embodiment of the invention presented below, reference is made to the accompanying drawings.

DETAILED DESCRIPTION OF THE INVENTION

Figure 1:
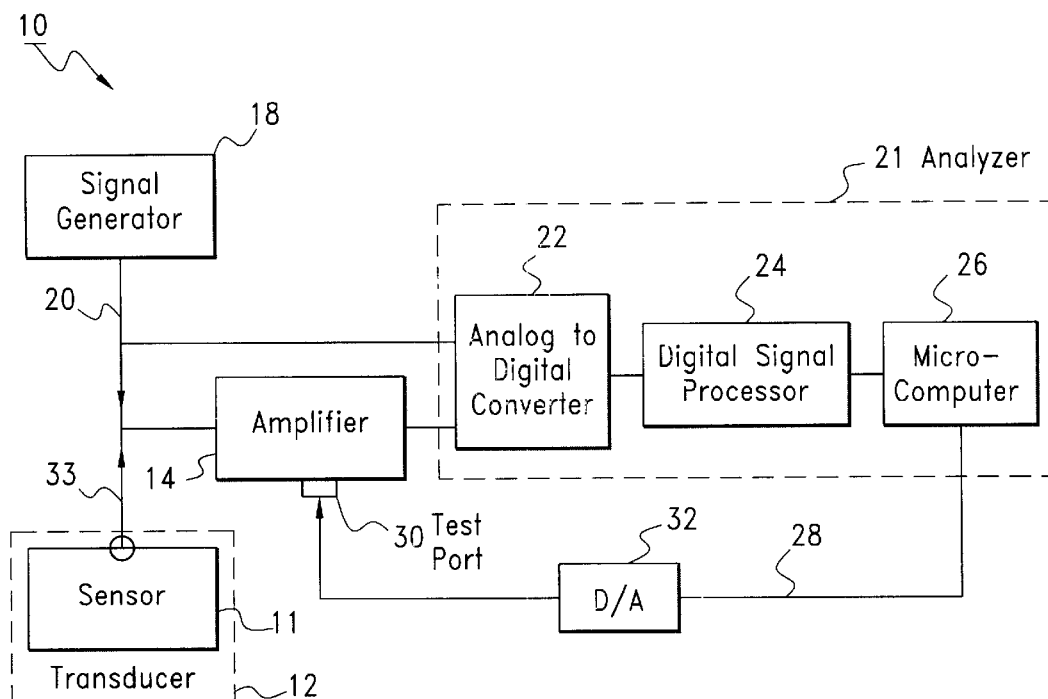
FIG. 1 is a block diagram of the transducer self-test system.

This invention provides a method and an apparatus for the in situ measurement of the electrical output impedance of any transducer allowing the transducer to have an internal self-testing circuit capable of implementing self-testing. In many cases the self-testing apparatus can be simply retrofitted to an existing transducer circuit. A block diagram of the self-test measurement system is shown in FIG. 1. The self-testing measurement system, also known as a self-testing circuit 10 and method can be conveniently implemented with an "intelligent" sensor shown in FIG. 1. The self-testing circuit 10 includes a sensor 11 with a circuit, called a transducer 12, an amplifier 14 sometimes called a preamplifier 14, a signal generator 18 that can generate a test signal 20 traveling in the direction of the arrow. The self-testing circuit 10 also has an analyzer 21 that can include an analog to digital converter 22, a digital signal processor 24 and a microcomputer 26. The microcomputer communicates to the pre-amplifier through a feedback loop 28 via a test port 30 containing a digital to analog converter 32.

In order to retrofit an existing transducer circuit the signal generator 18 and a coupling device, such as a capacitor, must be particularly placed and attached to the existing transducer circuit, as will be discussed in detail below. It is important to note that the arrangement and positioning of the transducer 12, the amplifier 14, the signal generator 18, reference, and analyzer 21 are important to this invention as will be discussed in detail. A significant advantage of this invention is that one skilled in the art can retrofit a transducer circuit with the circuits described in this invention. The very important information that these measurements will ascertain is described below. These measurements can then be taken by adding the additional analytic software and switching to "measurement mode". The measuring and analyzing of the various useful parameters will be discussed below in detail.

The transducer 12 of this invention can include one or more of a piezoelectric, capacitive or inductive devices, and can be from a class of transducers that are called self-generating transducers which include thermal couples, piezoelectric, and photovoltaic transducers among others. The present invention is well suited for application with a piezoelectric accelerometer that can measure mass compression or displacement and generate a measurable charge. The self-generating transducers do not require an external power supply because they generate a signal internally. Piezoelectric transducers have one or more characteristic resonant frequencies. The piezoelectric accelerometers can be crystals such as quartz crystals or ceramics such as Lead-Zirconate-Titanate (PZT). It is possible to send signals near the resonant frequencies to the transducer and measure the output in that frequency band without interfering with the operation of the transducer.

As shown in FIG. 1, the self-testing transducer circuit 10 includes the transducer 12, which is characterized by a self-resonant frequency, the amplifier 14 connected to the transducer that amplifies a transducer output signal 33, the signal generator 18 that generates the test signal 20 that has a spectrum at least overlapping the self-resonant frequency of the transducer also connected to the amplifier, and the analyzer 21 including the microcomputer 26. The analyzer 21 is connected to the output of the amplifier 14 for measuring the response of the transducer to the test signal 20 and to characterize at least one parameter of the transducer 12 such as mechanical quality factor Q, the resonant frequency, the total impedance, $Z_t$, and the mechanical impedance, $Z_m$.

The test signal 20 from the signal generator 18 is injected at a sensor node located at the junction of the sensor 11 and amplifier 14. The amplifier output is then digitized by the analog to digital converter 22 whose output is sent to a digital signal processor 24 that may compute the spectrum of the digitized signal or perform other signal processing. A microcomputer 26 is used to analyze the spectrum or other output of the digital signal processor. The signal generator 18 may produce a number of waveforms such as wide-band noise, sinusoidal oscillation, or a swept frequency narrow band signal. The signal generator output may be input to the analog to digital converter 22 so that correlation between self-test output signal and signal generator excitation may be computed. This may allow for the rejection of any other sensor signals that may be present by performing synchronous averaging or cross-correlation. The signal generator 18, analog to digital converter 22, digital signal processor 24, and microcomputer 26 may also comprise a digital spectrum analyzer or similar spectrum analysis tool.

Described in this application is a simple model of a piezoelectric accelerometer including the total output impedance of the imbedded sensor 11. Then, three specific embodiments of the self-test circuit 10 that can provide a measure of the transducer output impedance are discussed along with examples of the self-test circuit output signals for various sensor conditions and failure modes. The self-test circuits described below give output signals that reflect the total electromechanical output impedance of the installed sensor. The total output impedance contains information on the electrical properties of the sensor, the electromechanical coupling strength as well as the sensor mechanical input impedance and the mechanical impedance of the sensor input port termination. The power spectrum of a self-test circuit output is analyzed to provide the various measures of sensor health and function and the predicted output signals of the charge mode and voltage mode test circuits are computed as a function of the electrical and mechanical parameters of the transducer and amplifier. The quantitative inference of transducer and preamplifier parameters from the measured test circuit's output spectra and the interpretation of the data in terms of various failure modes is discussed below.

Figure 2:
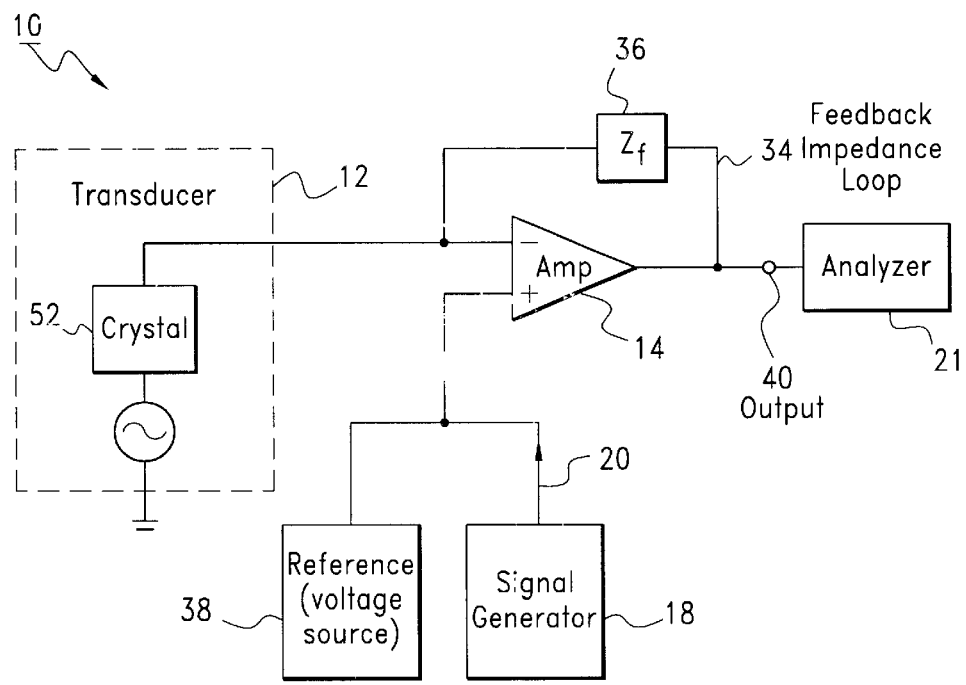
FIG. 2 is a schematic diagram of a generic self-test system.

As shown in FIG. 2 the self-testing transducer circuit 10 includes the transducer 12, which is characterized by a self-resonant frequency. The amplifier, often called a preamplifier 14 is connected to the transducer and the self-testing transducer circuit 10 includes a feedback impedance loop 34 with impedance ($Z_f$) 36. The self-testing transducer circuit 10 shown also includes the signal generator 18 to generate the test signal 20 connected to the preamplifier 14 along with a reference 38, shown here as a reference voltage source 38. The preamplifier output 40 is connected to various analyzers, such as analyzer 21 shown in FIG. 1. The analyzer measures the response of the transducer to the test signal and thus characterizes at least one parameter of the transducer.

Figure 3:
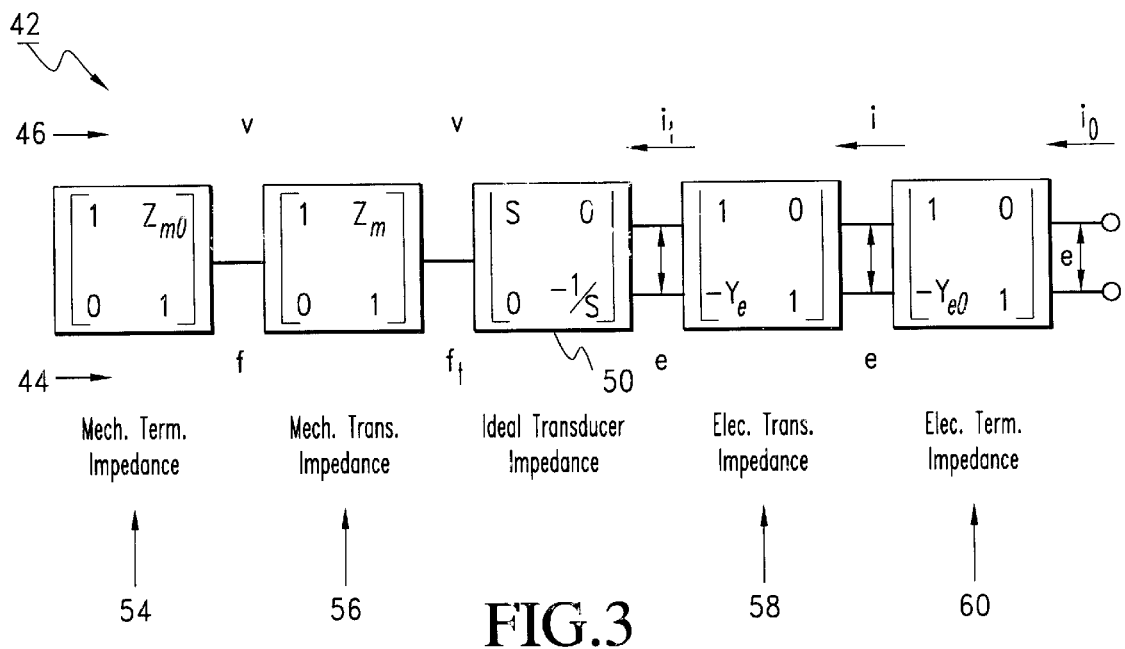
FIG. 3 is a schematic diagram of the generic transducer self-test system represented by a series of matrices.

Shown in FIG. 3, is a simple two-port model 42 of a piezoelectric transducer that was developed following the analysis presented by Neubert in order to design the self-testing transducer circuit 10 and related methods of use. In the two port representation we are using, the input variables 44 of the ideal transducer are force ft, and velocity, v while the output variables 46 are voltage, e, and current, i. The ideal piezoelectric transducer two-port representation is the 2×2 matrix 50 contained in the central block of FIG. 3 where S (Coulomb/meter) is a measure of the charge developed by a crystal 52 (shown in FIG. 2), $Q_t$, as a function of the crystal strain, x, as represented by the Equation (1):

$$Q_t = -Sx \qquad (1)$$

The complete model of the piezoelectric transducer as shown in FIG. 3 has the central block 50 representing the ideal transducer. The blocks to the left represent the transducer mechanical impedance 54 and the mechanical termination impedance 56 of the transducer. To the right of the ideal transducer block are the electrical transducer impedance block 58 and the electrical termination impedance 60. The solution of these matrices form the basis of the quantitative analysis of the transducer's output.

Figure 4:
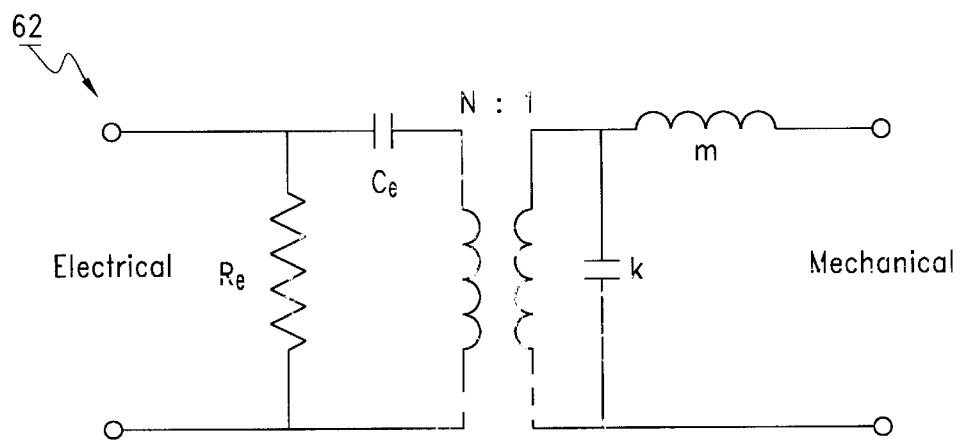
FIG. 4 is a schematic diagram of the generic transducer self-test system represented by electrical components.

FIG. 4 shows an electrical schematic of an ideal transducer 62 representing the crystal 52. The electrical schematic of the ideal electrical transformer 62 is designed with a turns ratio of N:1 where N=S (a measure of the charge developed). In this way the entire transducer, including the mechanical elements, may be represented as an equivalent electrical network. Although the analysis presented here will not employ this equivalent circuit representation the model is included as an alternative way to analyze the transducer output. The electrical equivalent circuit of the piezoelectric transducer, including the mechanical impedance and electrical transducer impedance, is shown. The ideal transducer is represented by a N:1 turns ratio transformer, the transducer electrical impedance is represented by the capacitance of the piezoelectric crystal $C_e$, and the leakage resistance of the sensor, $R_e$; the mechanical impedance of the transducer is represented by an inductor with a value equal to the transducer test mass, m, and compliance, k. Note that this representation is the equivalent of the central three blocks of FIG. 3.

Of interest in the present application is the apparent admittance (or equivalently the impedance) at the output of the sensor. This may be calculated in the following manner. First, we multiply the three central matrices displayed in FIG. 3 to find the system of equations that $$\begin{pmatrix} f \\ v \end{pmatrix} = \begin{pmatrix} 1 & Z_m \\ 0 & 1 \end{pmatrix} \begin{pmatrix} S & 0 \\ 0 & -1/S \end{pmatrix} \begin{pmatrix} 1 & 0 \\ -Y_e & 1 \end{pmatrix} \begin{pmatrix} e \\ i \end{pmatrix} = \begin{pmatrix} S + \frac{Z_m Y_e}{S} & -\frac{Z_m}{S} \\ \frac{Y_e}{S} & -\frac{1}{S} \end{pmatrix} \begin{pmatrix} e \\ i \end{pmatrix} \qquad (2)$$

relate the input force and velocity (f,v) to the output voltage and current (e,i) as shown above in Equation (2).

Next we assume that the input force is zero, i.e., no external signals are applied to the accelerometer. Solving the first of the two equations represented in Equation. (2) for i/e, the total output admittance of the sensor, $Y_{e\ total}$, is found.

Alternatively the sensor may be represented by an impedance, $Z_{e\ total} = 1/Y_{e\ total}$. The accelerometer signal is represented as a voltage source, $v_s$, in series with the sensor impedance or in the Norton equivalent circuit, by the sensor admittance in parallel with a current source. When the accelerometer is mounted on a mechanical structure, there is mounting-point impedance, $Z_{m0}$ that corresponds to the mechanical termination impedance 54 shown in FIG. 3. To include the mechanical impedance of the structure the mounting point impedance is added to the transducer impedance, $Z_m + Z_{m0}$. To solve these equations it is assumed that the accelerometer is mounted on an infinitely massive, non-compliant surface. Note that the value of S, the sensor coupling strength in the model, is derivable from the accelerometer parameters shown in Table 1 below.

The first two embodiments of the self-test apparatus and method of this invention are based on a generic operational amplifier as shown by (14) in FIG. 2. The third embodiment uses a "two-wire" charge preamplifier widely used with piezoelectric accelerometers. These self-test apparatus and procedures are for a transducer self-test circuit 10 to determine if a major failure, performance degradation or change in calibration of the sensor has occurred. The present invention also has the ability to track the calibration of an initially calibrated sensor may be sufficient to insure sensor data integrity by tracking changes in calibration from an initial primary calibration.

The self-test circuits described below fall into two categories, the so-called "three wire" preamplifiers in which three separate wires are used for signal, power and a common ground. The other configuration is the "two-wire" preamplifier in which the signal and power share one wire and the ground is assigned to a second wire. We will begin with a discussion of the three-wire circuits. There are two configurations of the "three wire" self-test circuit, the voltage-mode amplifier and the charge-mode amplifier.

Figure 5:
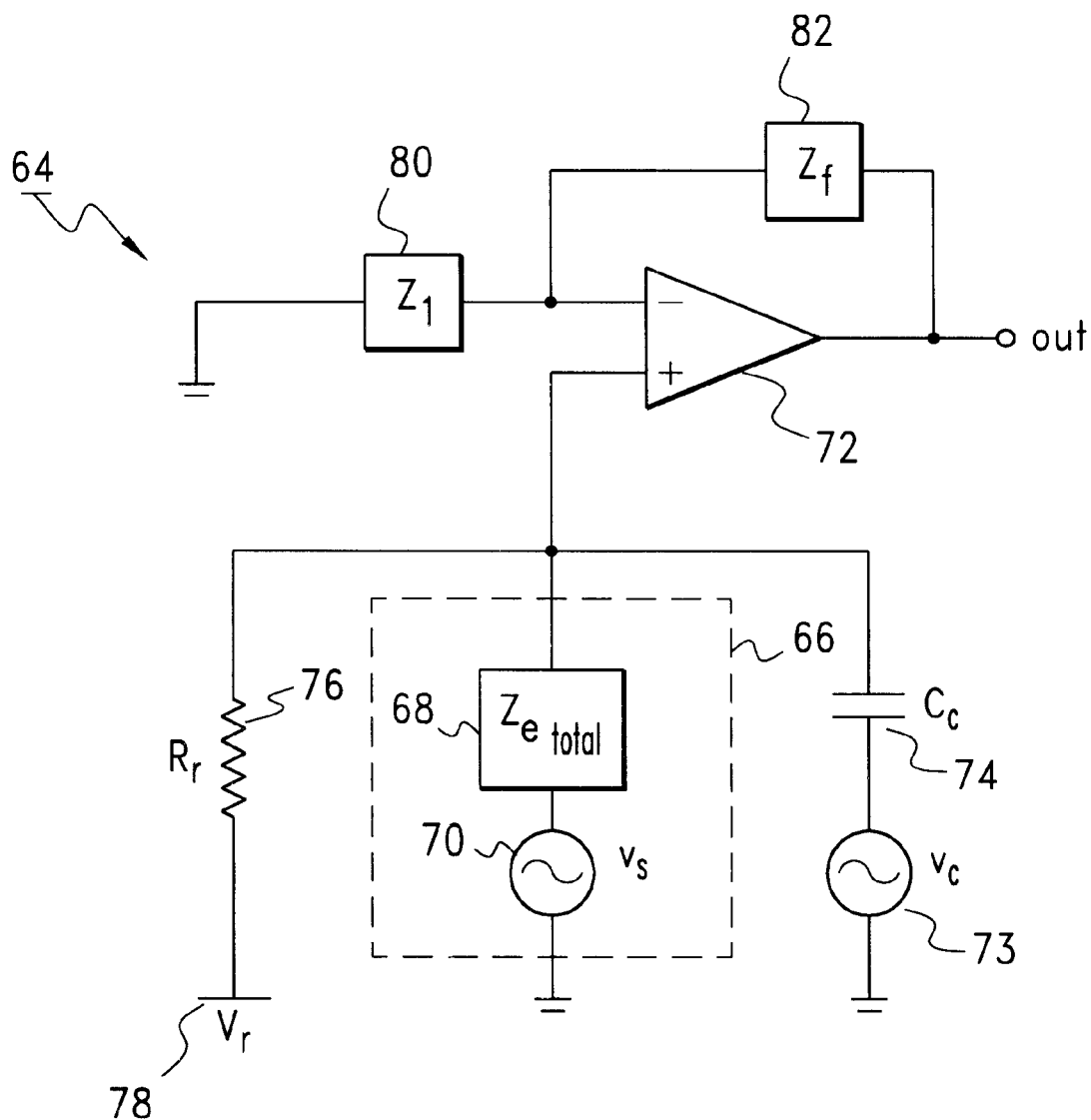
FIG. 5 is a schematic diagram of a three-wire voltage mode transducer self-test system.

A voltage mode self-test circuit 64 is shown in FIG. 5. A transducer 66 is represented by an electrical impedance 68 and signal generator 70 that is connected to the non-inverting input of an operational amplifier 72. A self-test signal source 73 is connected to the non-inverting input through a coupling capacitor 74. A high value resistor 76 connects the non-inverting input to a reference voltage source 78 to assure that the transducer signal range remains within the linear range of the amplifier. An impedance 80 is attached between the inverting input of the operational amplifier and ground and a feedback impedance 82 connects the output of the operational amplifier back to the non-inverting input. Retrofitting a conventional sensor of this type in the "three-wire voltage mode circuit" to the self-test capable sensor circuit 64 requires adding the self-test signal source 73 and the coupling capacitor 74 and adapting the software to run a testing sequence.

The three-wire voltage-mode configuration in FIG. 5 is one is which the sensor is placed at the non-inverting terminal of an operational amplifier, which has an assumed gain of A>>1. A bias voltage, $V_r$, is applied to the non-inverting input through a bias resistor $R_r$. The self-test signal, $v_c$, is also applied at this input through a capacitor $C_c$. A termination impedance, $Z_l$, is placed at the inverting input and the feedback impedance is $Z_f$. The expression for the output voltage is shown in equation (4) below:

$$v_{out} = \left(\frac{Z_1 + Z_f}{Z_1}\right)\left(\frac{1}{1+(Z_{e\ total}/R_r)(1+j\omega R_r C_c)}\right) \qquad (4)$$

$$\left(j\omega C_c Z_{e\ total} v_c + \frac{Z_1}{R_r}V_r + v_s\right)$$

Figure 6:
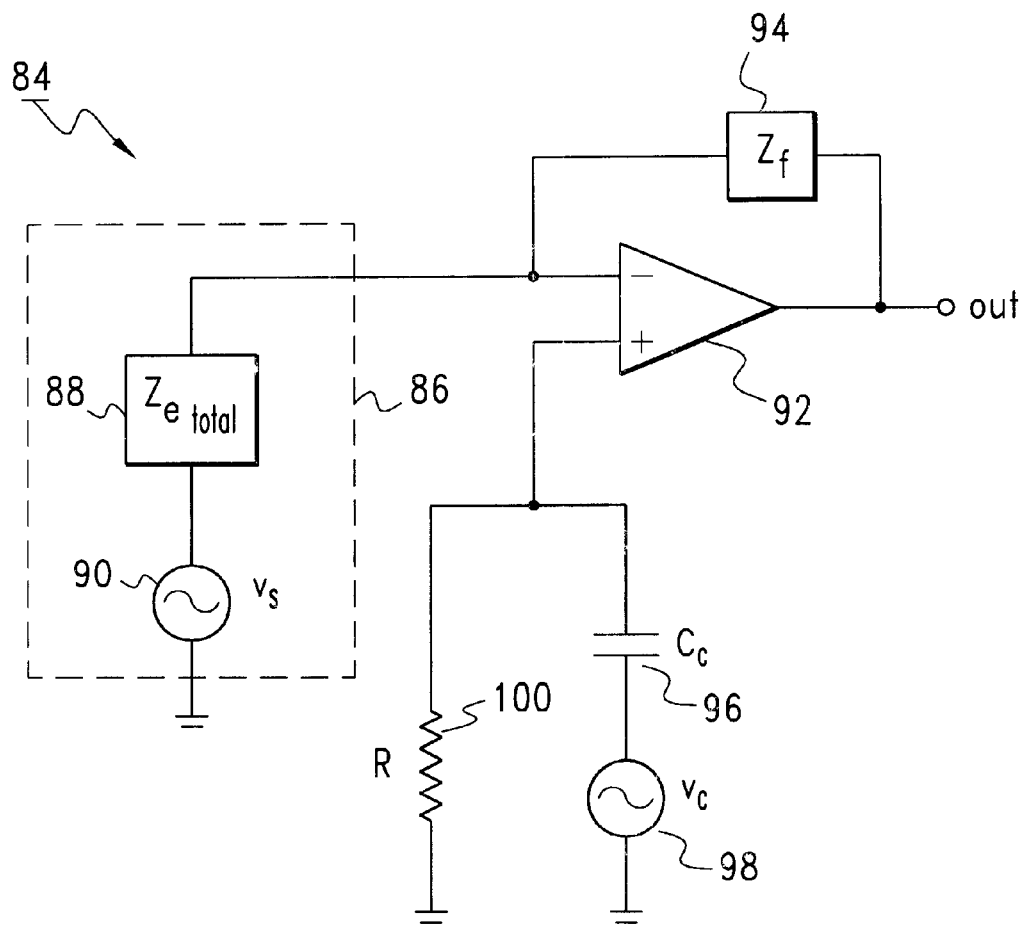
FIG. 6 is a schematic diagram of a three-wire charge amplifier transducer self-test system.

The three-wire charge mode preamplifier self-test configuration is shown in FIG. 6. In this configuration the sensor is placed at the inverting terminal of the ideal operational amplifier and the feedback impedance is $Z_f$. The self-test signal, $v_c$, is applied at the non-inverting input through the capacitor $C_c$. A resistor R is also placed at the non-inverting terminal to provide a dc reference. Note that the signal gain is the usual inverting amplifier expression. The output voltage is found.

A self-test circuit 84 is shown in FIG. 6 for the charge-mode amplifier. The parameters are the same as defined above. The self-test circuit 84 includes a transducer 86, represented by an electrical impedance 88 and a signal source 90 which is attached to an inverting input of an operational amplifier 92. A feedback impedance 94 is in communication with the transducer 86. The non-inverting input of the operational amplifier 92 is connected through a coupling capacitor 96 and to a signal generator 98. The non-inverting input of the operational amplifier is provided a dc reference level by a ground connection through a high value resistor 100. The output signal is a function of the electromechanical parameters of the sensor and preamplifier. Retrofitting a conventional sensor of the "charge-mode amplifier" type to the self-test capable sensor circuit 84 requires adding the self-test signal source 98, the coupling capacitor 96, and adapting the software to run a testing sequence.

Figure 7:
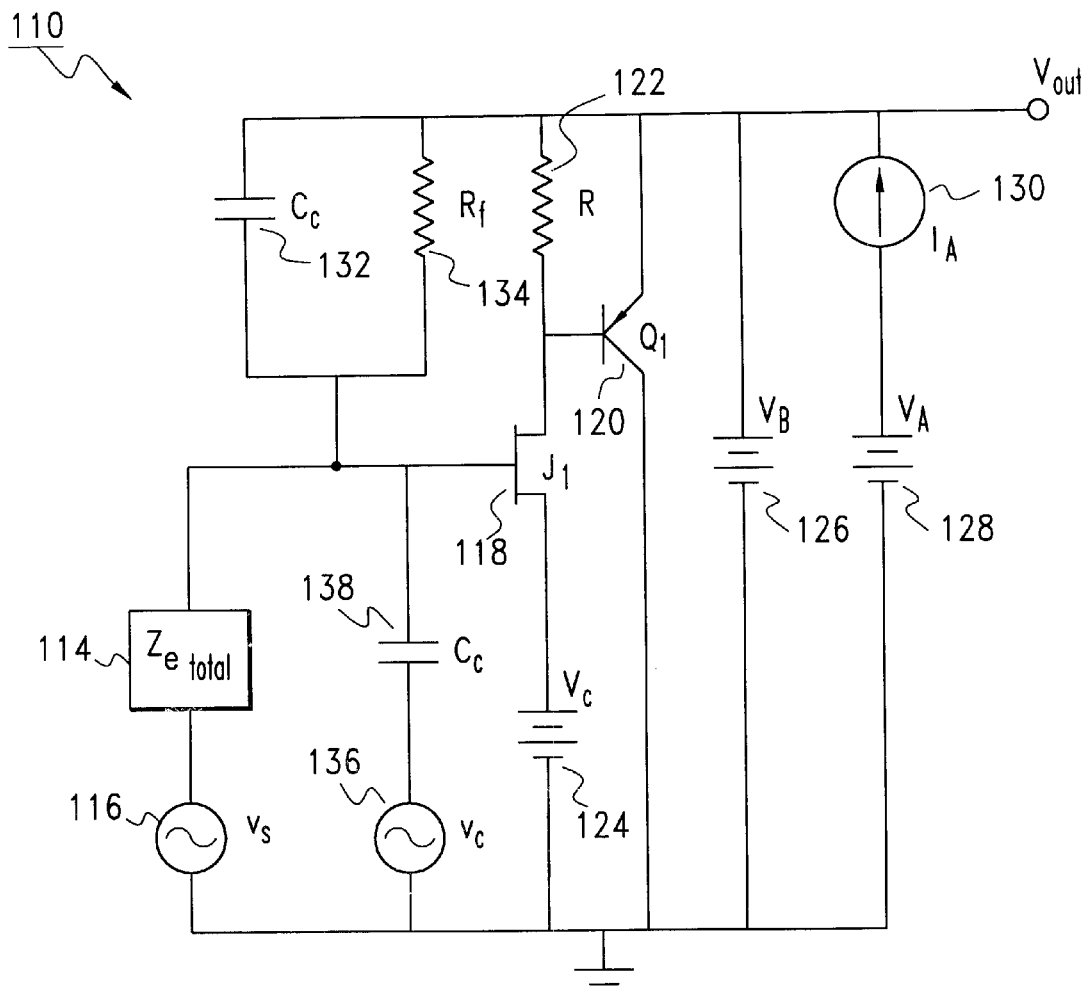
FIG. 7 is a schematic diagram of a two-wire charge mode preamplifier with transducer self-test system.

A "two wire" charge preamplifier implementation of the self-test circuit 110 is shown in FIG. 7. This circuit 110 is meant to represent a generic two-wire charge preamplifier that could have such variations as recognized by those skilled in the art. The transducer is represented by an electromechanical impedance 114, $Z_{e\ total}$, and a signal source 116, $v_s$ and it is attached to the input of the amplifier, which is the gate of a junction field effect transistor, JFET, 118. The two-wire amplifier is composed of a bipolar transistor 120 Q1, JFET drain resistor 122, R, and bias voltage sources, $V_A$ 124, $V_B$ 126, and $V_C$ 128. A constant current source 130, $I_A$, is also employed. A feedback capacitor 132, $C_f$, and resistor 134, $R_f$ complete the two-wire charge-mode amplifier. Variations and refinements in the design of the two-wire charge-mode amplifier will be apparent to those skilled in the art.

The self-test feature is implemented by a voltage source 136, $v_c$, coupled to the input of the charge preamplifier through a capacitor 138, $C_c$. Retrofitting a conventional sensor of the "two wire" charge preamplifier" type to the self-test capable sensor circuit 110 requires adding the self-test signal source 136, the coupling capacitor 138, and adapting the software to run a testing sequence. The two-wire self-test circuit was analyzed using the pspice circuit simulation described below. Included are sample computed output spectra for representative sensor and test circuit parameters. The sample computations are summarized below.

In practice the self-test voltage source will be either broadband pseudo-random white noise or a swept sine wave. Assuming that $V_c$ is broad band white noise the output spectra for the three-wire self-test configurations may be computed from Equations 4 and 5 above. Listed below are parameters representative of the OST charge mode accelerometers will be used in the sample computations. The relevant sensor parameters are given in Table 1. The electromechanical coupling constant S (C/m), coulomb per meter, may be computed from the accelerometer sensitivity (pC/g) by multiplying the sensitivity by $[10^{-12}(2\pi f_0)^2/9.8]$.

TABLE 1

Parameters of OST charge-mode accelerometers

| OST Model Number | A5006 | A5013 | A8120 |
|---|---|---|---|
| Sensitivity (pc/g) | 5 | 12 | 120 |
| Mounted frequency $f_0$ (kHz) | 35 | 30 | 20 |
| Proof Mass ($m_P$) (gm) | 0.7 | 1.6 | 17 |
| "S" (C/m) | 0.025 | 0.044 | 0.19 |
| Capacitance (pF) | 400 | 400 | 3600 |
| Total Mass ($m_T$) (gm) | 2.2 | 3.0 | 25 |

The accelerometer is represented mechanically by a simple harmonic oscillator with mass m, resonant frequency $f_0$ and mechanical quality factor Q. The mechanical impedance, $Z_m$ is the ratio of the force to the velocity of the oscillator, which in the frequency domain is given by equation (6) below:

$$Z_m(\omega) = \frac{m}{j\omega}\left(\omega_0^2 - \omega^2 + \frac{j\omega\omega_0}{Q}\right), \quad (6)$$

where $\omega_0 = 2\pi f_0$.

Figure 8:
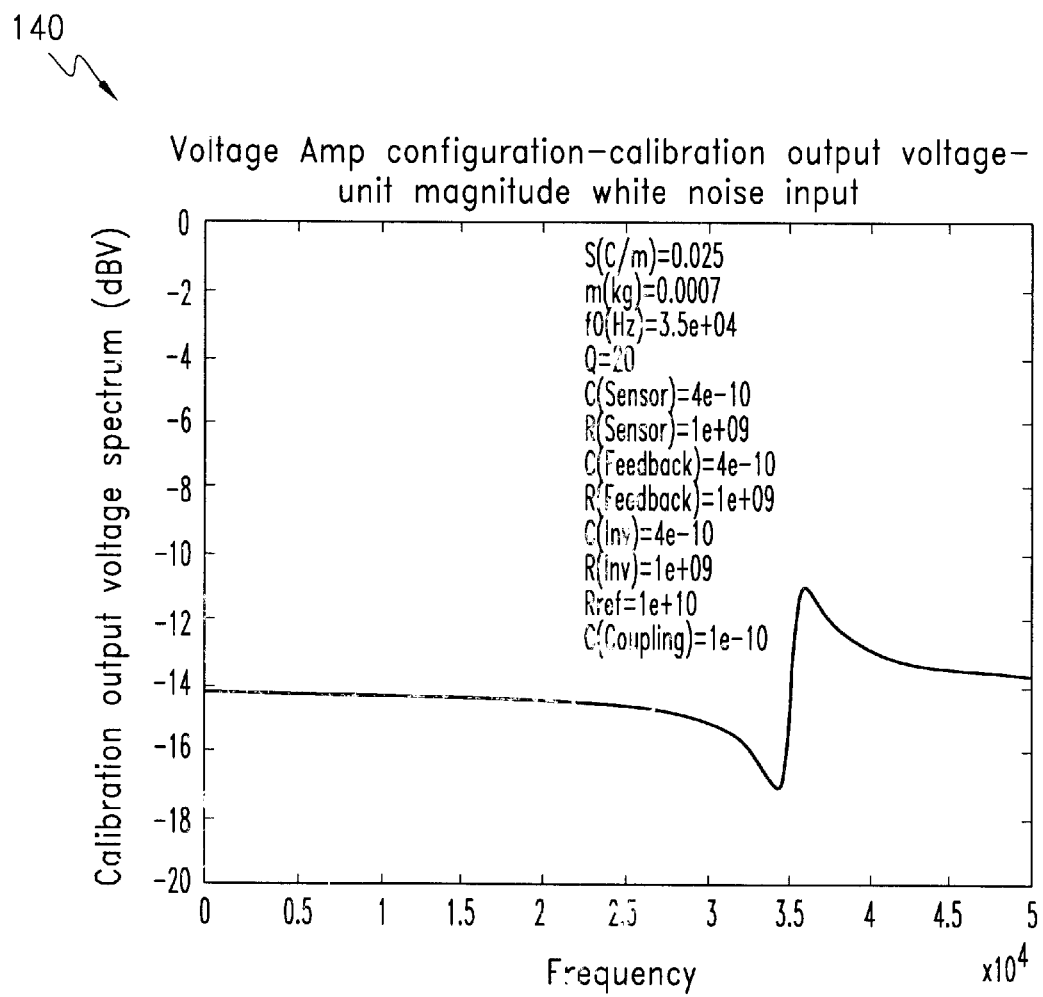
FIG. 8 is a graph of the representative output spectrum for the voltage-mode self-test circuit.

In the first example shown, FIG. 8, the computed three-wire voltage mode self-test output from the self-test circuit 64 is shown for the A5006 model accelerometer. The self-test circuit parameter values are displayed on the graph 140. The feedback capacitance and the capacitance at the inverting amplifier input are chosen to have the same value as the accelerometer, which gives a signal gain of 2 according to Equation 4. FIG. 8 shows the representative output spectrum for the voltage-mode self-test circuit 64.

Figure 9:
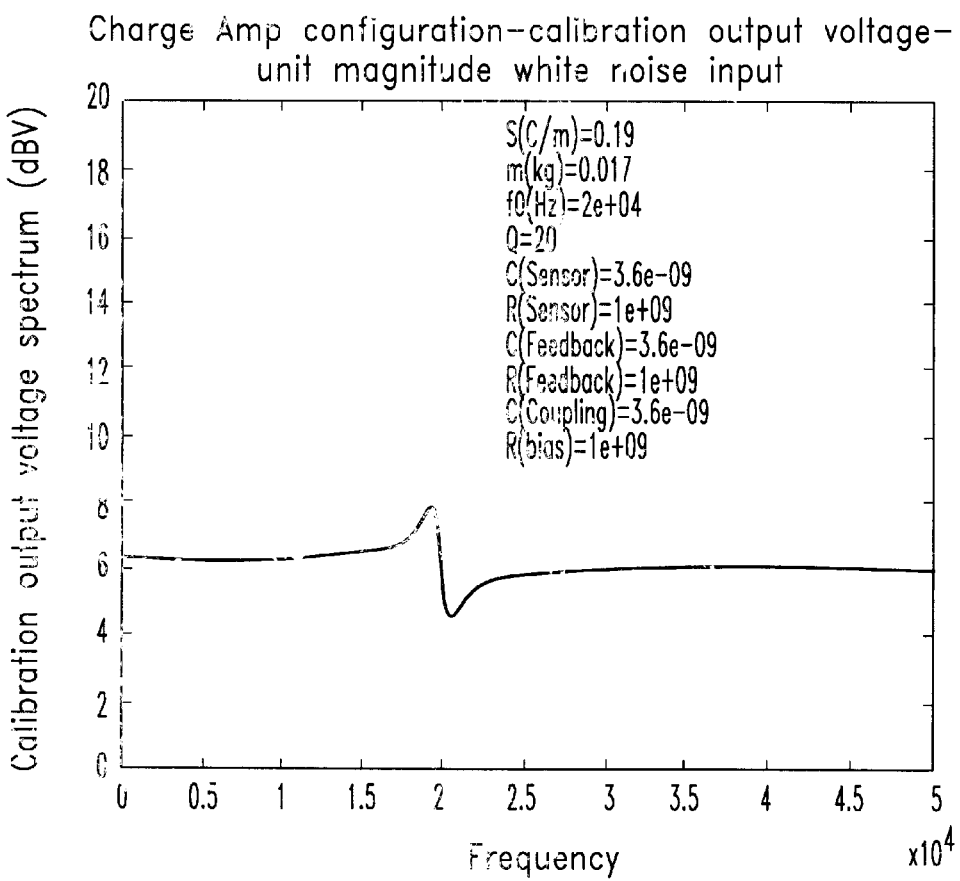
FIG. 9 is a graph of the representative output spectrum for the three-wire charge-mode self-test circuit.

FIG. 9 shows a graph 142 with a representative output spectrum for the three-wire charge mode self-test circuit 84 with similar parameters to those in FIG. 8. Two features obvious in the output spectra are the resonant frequency of the accelerometer, $f_0$, and the frequencies of the resonance and anti-resonance peaks near the accelerometer resonant frequency, see FIG. 10 for their identifications. Information concerning the accelerometer mechanical integrity, mounting conditions, damping, and electromechanical coupling strength may be extracted from a measurement of these parameters.

Figure 10:
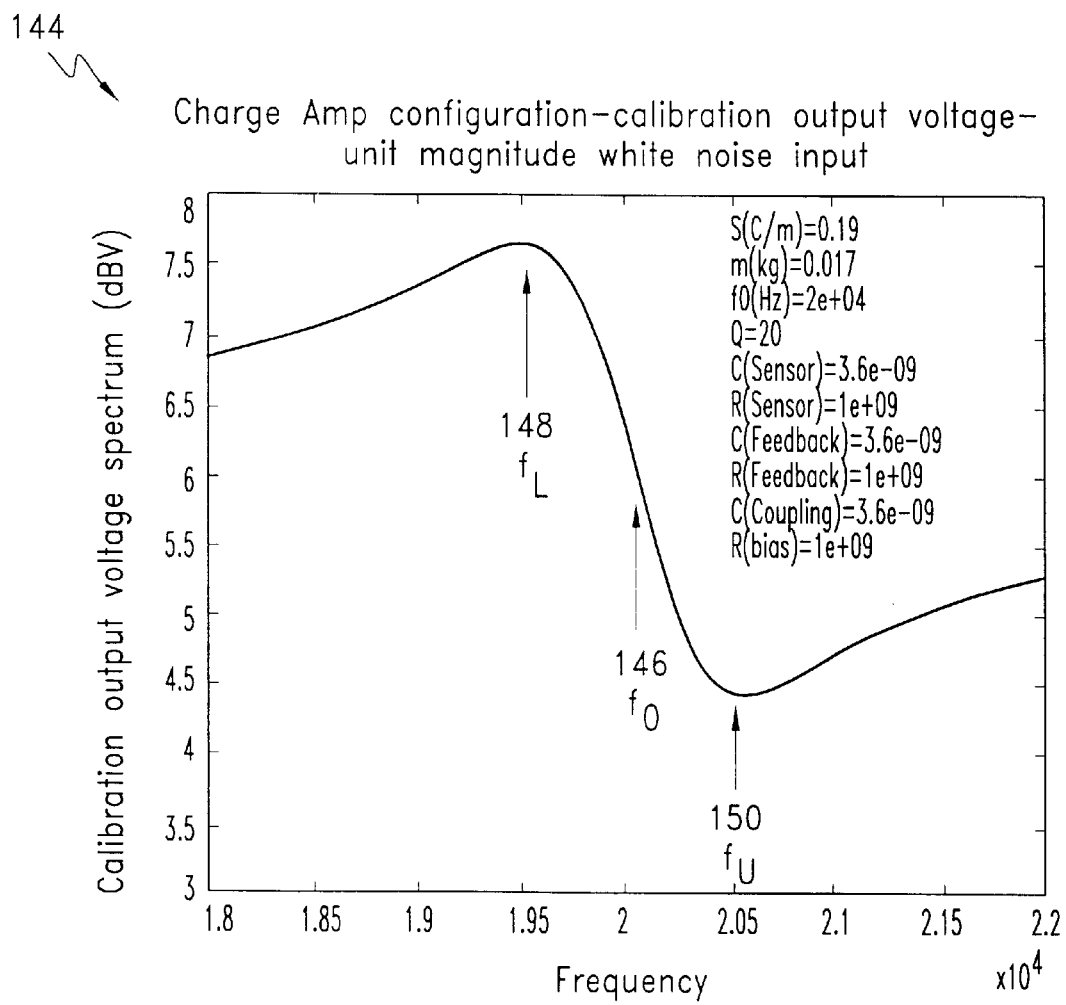
FIG. 10 is a representative output graph near the resonant frequency, $f_o$, showing the resonance and antiresonance.

FIG. 10 shows a graph 144 self-test circuit output near the resonant frequency 146, $f_o$, showing the resonance and anti-resonance at 148 $f_L$, and 150 $f_U$ respectively. For example the accelerometer resonant frequency, $f_0$, is determined by the spring constant of the piezoelectric crystal and the effective proof mass. If the accelerometer is rigidly attached to an "infinitely massive" reaction mass then the effective accelerometer proof mass is equal to the actual accelerometer proof mass. If the accelerometer base were to become detached from the reaction mass, the effective proof mass would decrease, thereby increasing the resonant frequency. The effective accelerometer proof mass, or reduced mass, is $m_{eff}=m_p(m_T-m_p)/m_T$. When the accelerometer is rigidly mounted to an "infinite" reaction mass the effective mass is equal to the proof mass, $m_p$. When the accelerometer is unmounted the reaction mass is ($m_T-m_p$). Using the numbers from Table 1, we calculate that the resonant frequency shifts may be as large as 22% (A5006), 46% (A5013), and 76% (A8120) when the accelerometer base becomes detached from the reaction mass.

The detailed frequency dependence of the output spectrum near $f_0$ is determined by the accelerometer's mechanical quality factor and the electromechanical coupling strength S. When the Q is high enough, "high enough" is determined by simulation, the normalized frequency difference between the resonant and anti-resonant peaks ($f_u-f_L$)/$f_0$ yields information about the electromechanical coupling strength S, i.e., the frequency splitting increases as the coupling strength increases.

The detailed functional dependence of $(f_u-f_L)/f_0$ on S is determined by the accelerometer design. When the resonance width $(1/Q)$ is comparable to the splitting, $(f_u-f_L)/f_0$, the output spectrum dependence on Q and S may be somewhat more complicated. However, if an initial test circuit output spectrum were measured, changes in S as the piezoelectric crystal gradually depolarizes over time could be detected by measuring the spectrum near $f_0$.

Figure 11:
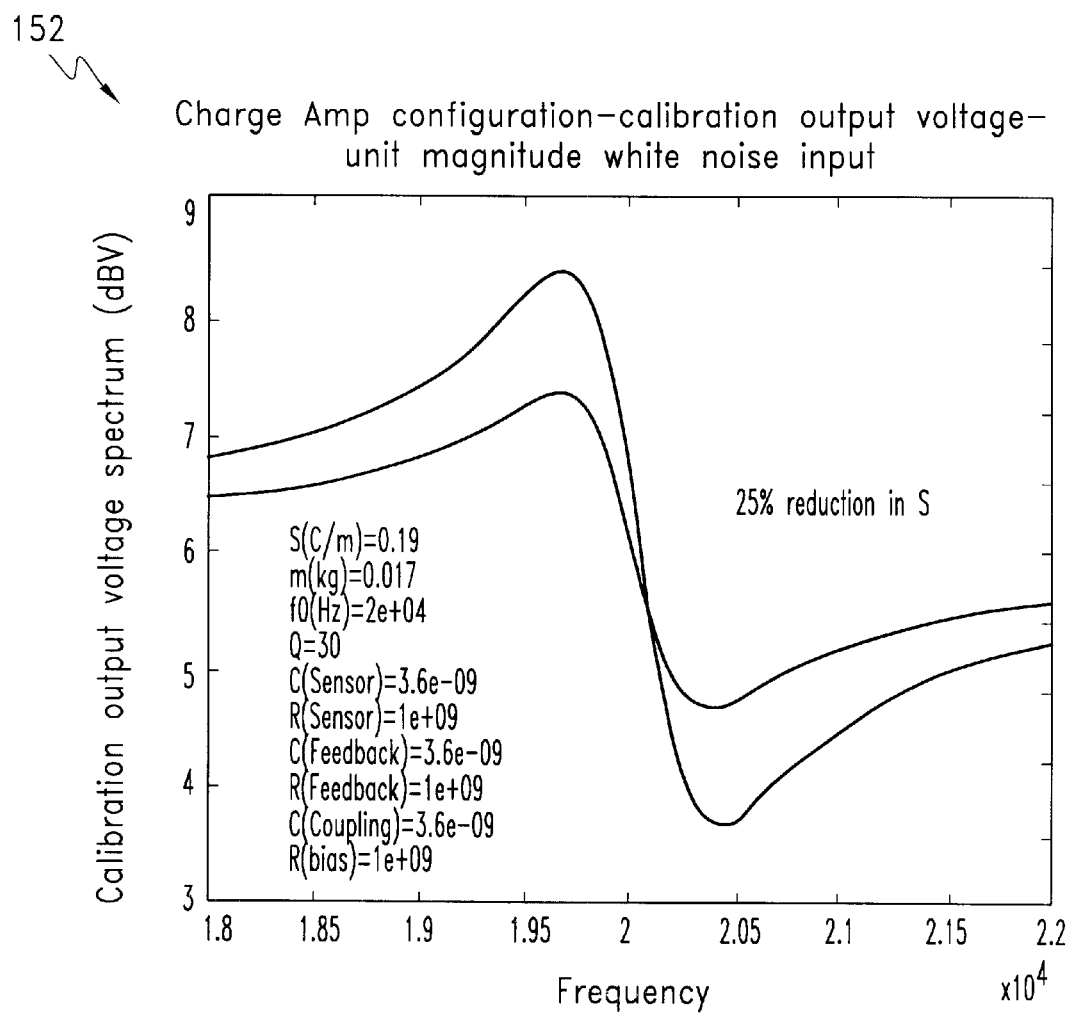
FIG. 11 is a representative output graph of the change in the output spectrum during a deterioration of the sensor coupling strength in the sensor self-test system.

The graph 152 in FIG. 11 shows the change in the output spectrum near the accelerometer resonance for a 25% reduction in the electromechanical coupling strength, S. When the Q is relatively low, 30 in this case, the dominant change is the reduction of the peak heights. The graph 152 also shows the change in the output spectrum for a 25% reduction in the electromechanical coupling strength S; parameters used are those of an OST A8120 accelerometer.

Figure 12:
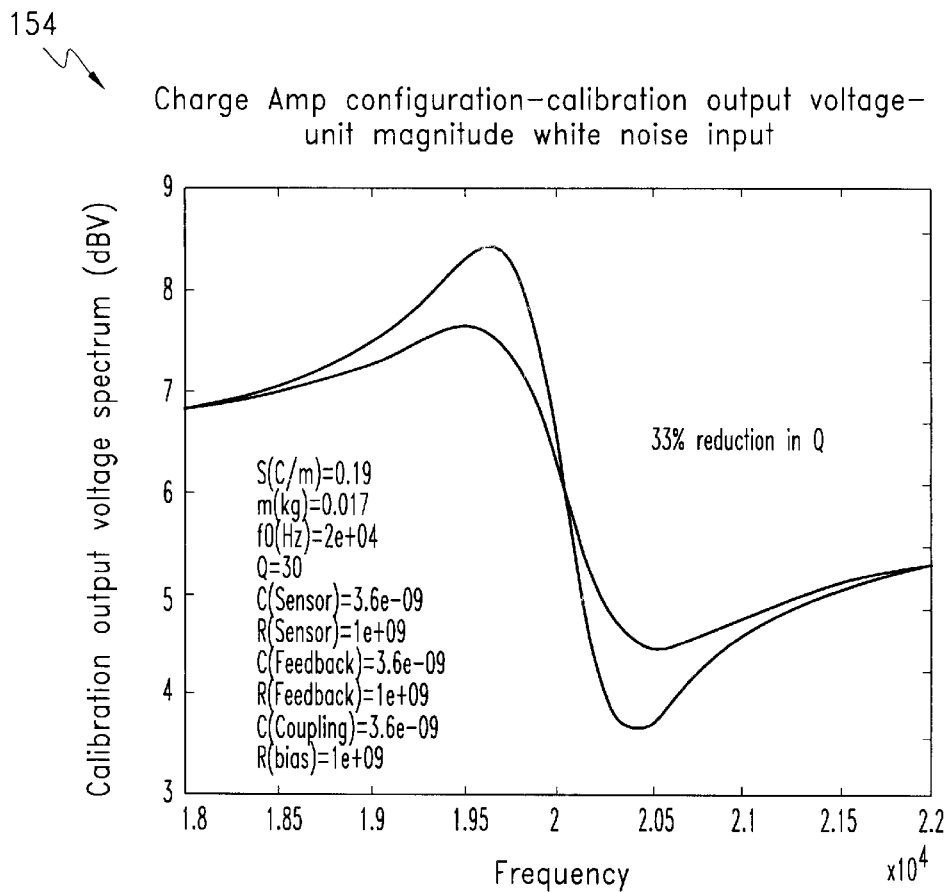
FIG. 12 is a representative output graph of the change in the output spectrum during a reduction of an accelerometer mechanical Q in the sensor self-test system.

The graph 154 in FIG. 12 shows the change in the output spectrum near the accelerometer resonance for a 33% reduction in the accelerometer mechanical Q. Note that a change in Q leads to a spectrum change only near resonance and the spectra are coincident away from the peak, unlike the case for a change in S.

The shape of the spectrum near resonance also is dependent upon the mechanical quality factor, Q, of the accelerometer. Significant changes in the mechanical Q would signal a compromise of the mechanical integrity of the accelerometer. The graph 154 shows the change in the output spectrum for a 33% reduction in the accelerometer mechanical quality factor, from 30 to 20. Note the difference between the signature of a Q change versus a change in the value of S. A shift in the Q leads to a spectral change only near resonance—the spectra are coincident away from the peak, unlike the case illustrating changes in S.

The analytical formulae presented above, constitute a full set of predictive tools for the output of the three-wire, self-test circuits as a function of the accelerometer and preamplifier parameters. The two-wire preamplifier is more complex and its analysis is most easily carried out using a circuit simulation tool such as Pspice. A sample simulation 156 of the two-wire charge mode preamplifier self-test circuit 110 is shown in FIG. 13.

In this example, based on the simulation, the piezoelectric accelerometer is represented by its capacitance, 400 pico-Farads 158 in this case, and an equivalent inductance chosen to yield the mechanically resonant frequency of the accelerometer. A series resistor 160 is included with the inductor to mimic the accelerometer's mechanical quality factor. In the simulation shown, the self-test source 162, V4, is coupled to the preamplifier input through a 22-pF capacitor 164. The feedback capacitor 166 is chosen to be 400 pF so that the charge amplifier has unity gain. The feedback resistor is chosen to give low frequency response, down to approximately 1 Hz.

Figure 13:
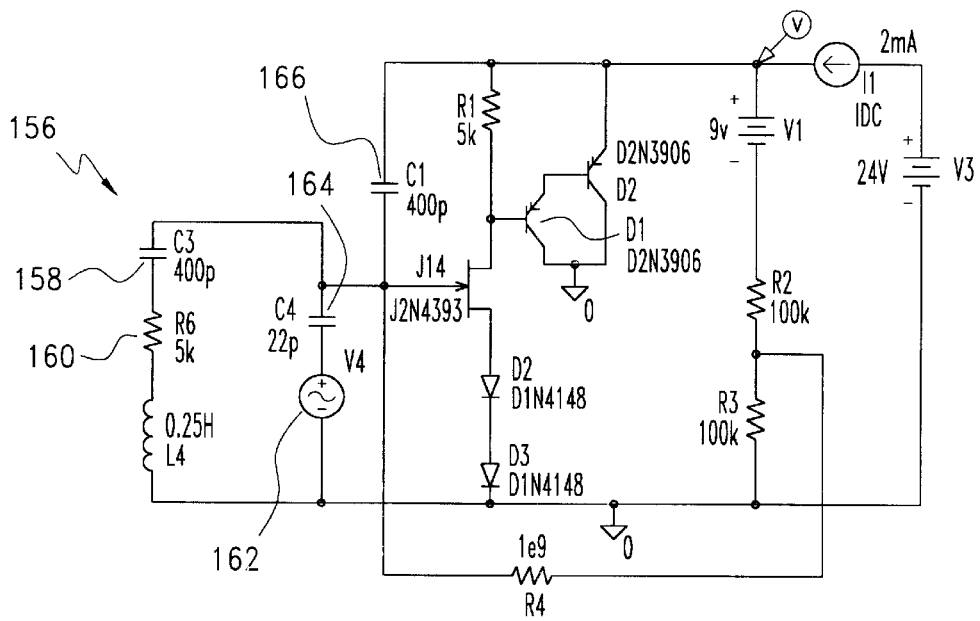
FIG. 13 is a circuit diagram of the sensor self-test system for a two-wire charge preamplifier.

There are two other differences between the simulation circuit, FIG. 13, and the generic two-wire charge preamplifier circuit shown is FIG. 7. First is the use of two bipolar transistors to yield an effectively higher value of transistor current gain (Beta), the second is a "bootstrap" circuit consisting of R3 and R2 which allows the use of a smaller feedback resistor, R4, than would otherwise be required to obtain low-frequency response. Typically in the two-wire charge preamplifier circuit a constant current diode is used in the power supply line, this is represented by the 2 mA current source. Various other bias points are set by sources, or the voltage drop across forward biased diodes, as used on the JFET source.

Figure 14:
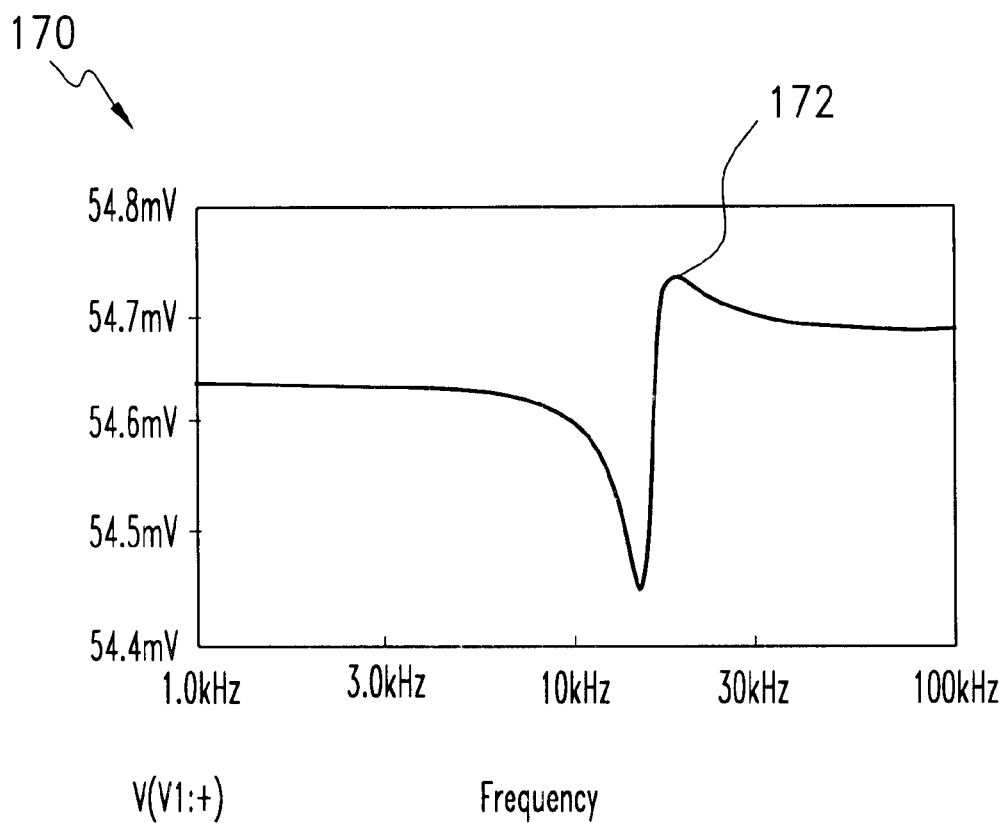
FIG. 14 is a representative frequency output graph of the frequency response of the two-wire charge amplifier during a Pspice simulation of the circuit sensor self-test system.

The simulation result graph 170 using a unit voltage swept sine wave for the self-test source, V4, is shown in FIG. 14. The resonant peak 172 corresponding to the electromechanical resonance of the accelerometer appears as it does in the three-wire voltage mode self-test circuit. This is because in the three-wire voltage mode circuit the sensor is connected to the non-inverting op-amp terminal and the two-wire amplifier is similarly non-inverting. If V4 were a broadband noise source and the spectrum of the output voltage was computed, a similar frequency response would be obtained. As in the previous cases the output spectrum, or frequency response, may be interpreted to yield information about the "health" of the accelerometer and the preamplifier circuit. In FIG. 14 a Pspice simulation of the frequency response of the two-wire charge amplifier with self-test configuration is shown. The circuit parameters used are shown in FIG. 13. An output similar to the three-wire voltage mode amplifier is obtained in this configuration.

The self-test circuits presented in this report permit the user to determine the "health" of a piezoelectric acceleration sensor, including the preamplifier, by measuring the frequency response of the sensor-circuit combination. This is accomplished by coupling a broadband noise or swept sine wave source to the input of a self-test circuit. The frequency response of the circuit yields a measure of the accelerometer's output impedance, which is a function of its mechanical parameters, electrical parameters, piezoelectric coupling strength and mounting conditions. Electrical parameters of the preamplifier also may be inferred from the frequency response data.

Self-test circuit frequency response data may be fit numerically to the analytical formulae given above or to circuit simulation results to yield estimates of the accelerometer and preamplifier component parameters. Failures and degradations such as accelerometer base detachment, sensor mechanical failure as indicated by the mechanical quality factor, electrical lead detachment, electronic component deterioration, failure of the sensor preamplifier and gradual depolarization of the PZT elements may be determined by this method. This method may also allow one to track changes in the calibration of an accelerometer with an initially known calibration.

The circuits and techniques described in this disclosure apply specifically to piezoelectric accelerometers, however they are applicable to in-situ testing of a variety of transducer devices including but not limited to piezoelectric, capacitive, and inductive transducers. In general such sensors employ an energy storage device such as a piezoelectric material, capacitor, or inductor, to store electromagnetic energy that in turn is transformed into an electronic signal by the modulation of the energy storage element. Specific examples of such transducers include condenser microphones, electret microphones, capacitive accelerometers, capacitive displacement and proximity sensors, capacitive pressure sensors, moving coil microphones, inductive rate sensors, piezoelectric pressure sensors and others. A common feature of such sensors is that the total electrical impedance of the output of the transducer is a function of the transducer's mechanical and electrical parameters and the frequency.

REFERENCES (a) Neubert, H. K. P., "Instrument Transducer", Clarendon Press, Oxford (1975).
(b) Morgan Matroc Inc., "Piezoelectric Technology: Data for Designers", available from www.morganelectroceramics.com.

We claim:
1. A self testing transducer circuit comprising:
(a) a transducer characterized by a self resonant frequency;

(b) an amplifier connected to the transducer amplifying the output of the transducer;

(c) a signal source coupled to the output of the transducer and the input of the amplifier, the signal source generating a test signal having a spectrum at least overlapping the self resonant frequency of the transducer; and (d) an analyzer connected to an output of the amplifier for measuring the response of the transducer to the test signal and characterizing at least one parameter of the transducer.

2. The self-testing transducer circuit of claim 1 in which the amplifier comprises a charge mode amplifier, the transducer is connected to a sense node of the amplifier, and the test signal source is connected to a reference node of the amplifier.

3. The self-testing transducer circuit of claim 1 in which the amplifier comprises a voltage mode amplifier, the transducer is connected to a non inverting input of the amplifier, and the test signal source is connected to the non inverting input of the amplifier; and a reference signal is connected to an inverting input of the amplifier.

4. The self-testing transducer circuit of claim 1 in which the amplifier comprises a single ended transistor amplifier and the transducer and the test signal generator are connected to an input of the amplifier.

5. The self-testing transducer circuit of claim 1 in which the test signal comprises a swept frequency test signal.

6. The self-testing transducer circuit of claim 1 in which the test signal comprises a white noise test signal.

7. A test method comprising;
(a) providing a transducer capable of measuring one or more parameters:
(b) connecting the transducer to an amplifier for amplifying an output of the transducer;
(c) generating a test signal having a spectrum at least overlapping a self-resonant frequency of the transducer;
(d) coupling the test signal to the transducer and the input of an amplifier;
(e) amplifying the output of the transducer with the amplifier; and
(f) analyzing the signal created by the sensor transducer and characterizing at least one parameter.

8. The method of claim 7 in which the step of analyzing the signal comprises determining the resonant frequency of the transducer from the signal.

9. The method of claim 7 in which the step of analyzing the signal comprises determining the Q of the signal created by the sensor.

10. The method of claim 7 in which the step of analyzing the signal comprises storing a reference signal, and comparing a later obtained signal to the reference signal.

11. The method of claim 7 in which the test signal comprises a swept frequency test signal.

12. The method of claim 7 in which the test signal comprises a white noise test signal.

13. A testing method comprising:
(a) generating a test signal from a signal source having an output spectrum overlapping a self-resonant frequency of a transducer capable of measuring one or more parameters;
(b) coupling the test signal to the transducer and the input of an amplifier;
(c) amplifying a signal created by the sensor transducer in response to the test signal; and
(d) analyzing the signal created by the sensor transducer and characterizing at least one parameter of the sensor.

14. The method of claim 13 in which the step of analyzing the signal comprises determining the resonant frequency of the transducer from the signal.

15. The method of claim 13 in which the step of analyzing the signal comprises determining the Q of the signal created by the sensor.

16. The method of claim 13 in which the step of analyzing the signal comprises storing a reference signal, and comparing a later obtained signal to the reference signal.

17. The method of claim 13 in which the test signal comprises a swept frequency test signal.

18. The method of claim 13 in which the test signal comprises a white noise test signal.

19. The method of claim 13 in which one parameter comprises a range of failure conditions.

20. The method of claim 13 in which one parameter comprises a range of degradation conditions.

21. The method of claim 13 in which analyzing the signal created by the sensor and characterizing at least one parameter of the sensor further comprises analyzing a sensor's total output impedance as a function of frequency.

22. The method of claim 21 in which the one parameter comprises one or more parameters corresponding to and derived from the total output impedance.

23. A self testing transducer circuit comprising:
a transducer characterized by a self resonant frequency;
an amplifier comprising a charge mode amplifier, such that the transducer is connected to a sense node of the amplifier, amplifying the output of the transducer;
a signal source coupled to the output of the transducer and a reference node of the amplifier, the signal source generating a test signal having a spectrum at least overlapping the self resonant frequency of the transducer; and
an analyzer connected to an output of the amplifier for measuring the response of the transducer to the test signal and characterizing at least one parameter of the transducer.

24. A sensor testing method comprising:
generating a test signal from a signal source having an output spectrum overlapping a self-resonant frequency of a transducer of the sensor;
coupling the test signal to the transducer and the input of an amplifier;
amplifying a signal created by the sensor in response to the test signal; and
analyzing the signal created by the sensor and characterizing at least one parameter of the sensor, comprising analyzing a sensor's total output impedance as a function of frequency.

25. A sensor testing method comprising:
generating a test signal from a signal source having an output spectrum overlapping a self-resonant frequency of a transducer of the sensor;
coupling the test signal to the transducer and the input of an amplifier;
amplifying a signal created by the sensor in response to the test signal;
analyzing the signal created by the sensor and characterizing one or more parameters of the sensor corresponding to and derived from the total output impedance; and
further comprising analyzing a sensor's total output impedance as a function of frequency.

* * * * *

UNITED STATES PATENT AND TRADEMARK OFFICE
CERTIFICATE OF CORRECTION

PATENT NO. : 6,698,269 B2
DATED : March 2, 2004
INVENTOR(S) : Baber et al.

It is certified that error appears in the above-identified patent and that said Letters Patent is hereby corrected as shown below:

<u>Column 11,</u>
Line 42, "analyzing the signal created by the sensor transducer" should read
-- analyzing the signal created by the transducer --.
Line 64, "amplifying a signal created by the sensor transducer in" should read
-- amplifying a signal created by the transducer in --.
Line 66, "analyzing the signal created by the sensor transducer" should read
-- analyzing the signal created by the transducer --.

Signed and Sealed this

Eighth Day of June, 2004

JON W. DUDAS
*Acting Director of the United States Patent and Trademark Office*